(12) United States Patent
Takahashi et al.

(10) Patent No.: US 7,605,864 B2
(45) Date of Patent: Oct. 20, 2009

(54) IMAGE PICKUP APPARATUS AND ELECTRONICS APPARATUS MOUNTING THE SAME

(75) Inventors: Hiroshi Takahashi, Chiba (JP); Yoichi Nakano, Chiba (JP); Kenichi Kudou, Chiba (JP); Masao Fujiwara, Chiba (JP)

(73) Assignee: Seiko Precision Inc., Chiba (JP)

( * ) Notice: Subject to any disclaimer, the term of this patent is extended or adjusted under 35 U.S.C. 154(b) by 583 days.

(21) Appl. No.: 11/205,900

(22) Filed: Aug. 16, 2005

(65) Prior Publication Data
US 2006/0062100 A1    Mar. 23, 2006

(30) Foreign Application Priority Data
Aug. 24, 2004    (JP) .............................. 2004-244250

(51) Int. Cl.
*H04N 5/225* (2006.01)
(52) U.S. Cl. .................................. 348/374; 348/207.99
(58) Field of Classification Search ................. 348/340, 348/373–376; 455/557, 575.3, 575.4
See application file for complete search history.

(56) References Cited

U.S. PATENT DOCUMENTS 7,114,862 B2 * 10/2006 Huang ......................... 396/452

| | | | |
|---|---|---|---|
| 2004/0149884 A1* | 8/2004 | Shiau | 250/208.1 |
| 2005/0007484 A1* | 1/2005 | Tan et al. | 348/340 |
| 2005/0179803 A1* | 8/2005 | Sawai | 348/335 |
| 2005/0195315 A1* | 9/2005 | Naganuma | 348/367 |
| 2006/0006239 A1* | 1/2006 | Tanaka | 235/472.01 |
| 2006/0006511 A1* | 1/2006 | Roh et al. | 257/680 |
| 2006/0024880 A1* | 2/2006 | Chui et al. | 438/222 |

FOREIGN PATENT DOCUMENTS

| | | |
|---|---|---|
| JP | 05-088232 | 4/1993 |
| JP | 11-142906 | 5/1999 |
| JP | 2004015602 | 1/2004 |
| JP | 2004-145144 | 5/2004 |

OTHER PUBLICATIONS

Office Action dated Aug. 7, 2008 for Japanese Patent Application No. 2004-244250.

* cited by examiner

*Primary Examiner*—Lin Ye
*Assistant Examiner*—Euel K Cowan
(74) *Attorney, Agent, or Firm*—Michaud-Duffy Group LLP

(57) ABSTRACT

There is provided an image pickup apparatus having an image pickup unit having an image pickup element, an optical unit having lenses, a sector drive unit having sectors arranged in a space for arranging the sectors, and supporting members being fixed in the space for arranging the sectors and having lengths equal to at least a width of the space for arranging the sectors in a light axis direction.

3 Claims, 7 Drawing Sheets

IMAGE PICKUP APPARATUS AND ELECTRONICS APPARATUS MOUNTING THE SAME

BACKGROUND OF THE INVENTION

1. Field of the Invention

This invention generally relates to image pickup apparatuses and electronics apparatuses mounting the same, and more particularly, to an image pickup unit having a sector, also known as shutter blade, on a subject side of a lens.

2. Description of the Related Art

Conventionally, a general image pickup apparatus includes the sector arranged between an optical unit having the lens and the image pickup unit having an image pickup element. In order to move the shutter blade, a sector drive unit, also known as shutter device, has to be composed of a substrate that supports the sector and a drive source such as step motor. The conventional image pickup apparatus includes the sector drive unit arranged between other component elements, resulting in restrictions in design and manufacturing of the sector drive unit.

Japanese Patent Application Publication No. 2004-15602 (hereinafter referred to as Document 1) describes the shutter device arranged on the subject side of a camera module, enabling downsizing of the shutter device and protection of the lens.

On the image pickup apparatus disclosed in Document 1, however, the camera module and the shutter device are arranged facing each other. If an impact is applied, the camera module and the shutter are brought into contact and apply loads to each other, causing the shutter blade to curve. This arises the problem in that the shutter blade cannot move smoothly.

SUMMARY OF THE INVENTION

The present invention has been made in view of the above circumstances and provides an image pickup apparatus and an electronics apparatus having the same, in which the load applied to the sector can be reduced.

According to one aspect of the present invention, preferably, there is provided an image pickup apparatus including an image pickup unit having an image pickup element, an optical unit having lenses, a sector drive unit having sectors arranged in a space for arranging the sectors, and supporting members being fixed in the space for arranging the sectors and having lengths equal to at least a width of the space for arranging the sectors in a light axis direction. With the supporting members, the space for arranging the sectors can be retained and loads to be applied on the sectors can be alleviated.

According to another aspect of the present invention, preferably, there is provided an electronics apparatus comprising the above-mentioned image pickup apparatus. The supporting members may protrude from the space for arranging the sectors in the light axis direction and be in contact with a chassis of the electronics apparatus. This makes it possible to fix the image pickup apparatus onto the chassis stably and reduce the loads to be applied on the sectors.

BRIEF DESCRIPTION OF THE DRAWINGS

Preferred embodiments of the present invention will be described in detail with reference to the following drawings, wherein.

DESCRIPTION OF THE PREFERRED EMBODIMENTS

Figure 1:
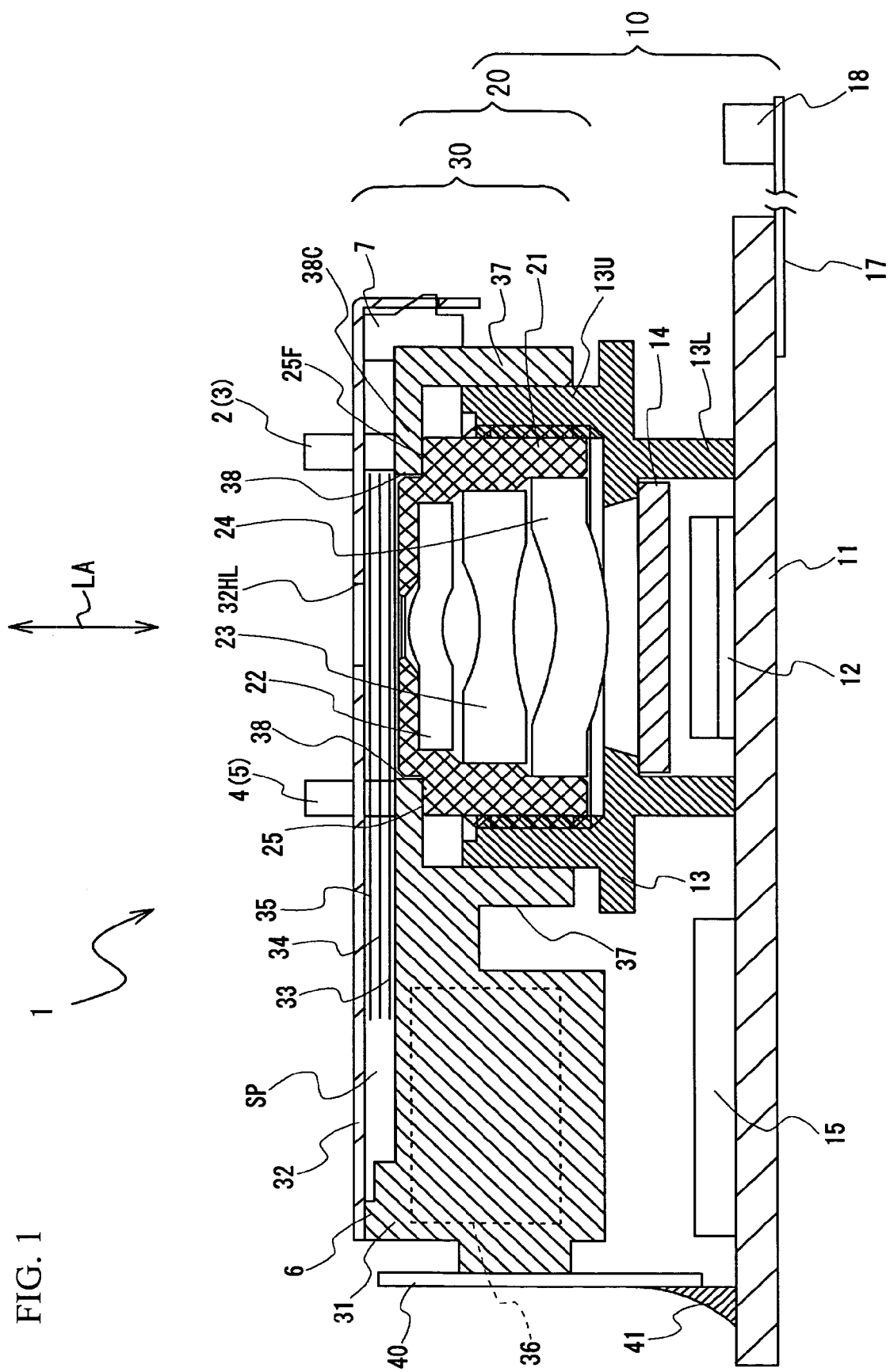
FIG. 1 is a side view of an image pickup apparatus to show the inside thereof.

A description will now be given, with reference to the accompanying drawings, of an embodiment of the present invention. FIG. 1 is a side view of an image pickup apparatus 1 to show the inside thereof. The image pickup apparatus 1 is configured to include three main units. That is to say, the image pickup apparatus 1 includes an image pickup unit 10 having an image pickup element therein, an optical unit 20 having lenses, and a sector drive unit 30 that drives the sector. Referring to FIG. 1, the image pickup unit 10, the optical unit 20, and the sector drive unit 3 are piled up in this order in the image pickup apparatus 1. The aforementioned three units are provided to partially overlap each other in upper and lower portions thereof. Here, the image pickup unit 10 and the optical unit 20 are referred to as an image pickup optical module.

The image pickup unit 10 includes an image pickup substrate 11, an image pickup element 12, a lens barrel 13, and an optical filter 14. The image pickup element 12 is an image sensor such as CCD, CMOS, or the like, and is fixed onto a given position of the image pickup substrate 11. The lens barrel 13 is substantially tube-shaped, and is fixed onto the image pickup substrate 11 to surround an outer circumference of the image pickup element 12. The optical filter 14 such as IR cut filter or the like is arranged in a lower portion 13L of the lens barrel 13. In addition, an upper portion 13U of the lens barrel 13 is engaged with a portion of the optical unit 20 and that of the sector drive unit 30, as will be described later. A FPC (Flexible Printed Circuit) 17 is provided for connecting the electronics apparatus such as camera, mobile telephone, or the like, and is connected to a wiring pattern, not shown, formed on the image pickup substrate 11. Also, the FPC 17 is equipped with a connector 18 so as to establish connection with a main circuit board (motherboard) or the like provided on the electronics apparatus.

A lens holder 21, which is included in the optical unit 20, is fit into the upper portion 13U of the lens barrel 13. Three lenses 22, 23, and 24 are held inside the lens holder 21. A screw is provided so that the surface of the outer circumference of the lens holder 21 and the surface of the inner circumference of the upper portion 13U of the lens barrel 13 can be screwed together. Therefore, the lens holder 21 is rotated against the lens barrel 13 to change the position in a light axis direction LA for the focus adjustment so that an incoming light can be focused onto the image pickup element 12 through the lenses 22, 23, and 24. After the focus adjustment is completed, the lens holder 21 is fixed into the lens barrel 13 with an adhesive agent.

A cut out portion 25, in which the circumference is cut out in a step shape, is formed on an upper end (an end on the subject side) of the lens holder 21. The cut out portion 25 includes an annular surface 25F perpendicular to the light axis direction LA. A sector substrate 31 of the drive unit 30 is contact with the annular surface 25F.

The sector drive unit 30 is arranged in the upper portion of the optical unit 20. Generally, the sector drive unit 30 includes a device named a sector drive device or a shutter device. The sector drive unit 30 is arranged closer to the subject than to the optical unit 20 in the image pickup apparatus 1 embodying the present invention. More specifically, the sector substrate 31 included in the sector drive unit 30 is partially fixed onto the lens holder 21 of the optical unit 20. A sector pressing plate 32 is arranged to face the sector substrate 31. Three pieces of sectors 33, 34, and 35 are interposed in a sector arrangement space SP between the sector substrate 31 and the sector pressing plate 32.

Figure 2:
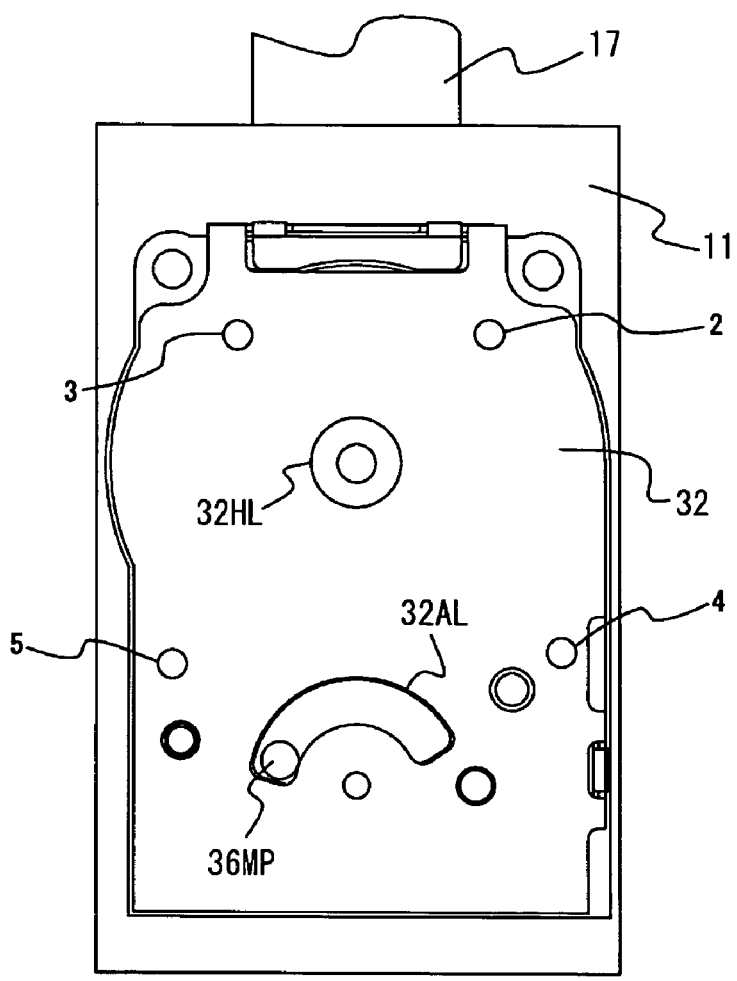
FIG. 2 is a top view of a sector pressing plate.

The sector pressing plate 32 is supported by protrusions 6 and 7 provided on both ends of the sector substrate 31, column-shaped supporting members 2, 3, 4, and 5 integrally provided with the sector substrate 31. The supporting members 2, 3, 4, and 5 are provided in regions of the sector substrate 31, the regions overlapping the lens holder 21 in the light axis direction of the lenses 22 through 24. The number of the supporting members is not limited to four, yet the number may be more or less than four. The supporting members may be provided separately from the sector substrate 31, and in this case, the supporting members are securely fixed onto the sector substrate 31 by the adhesive agent or the like. The supporting members 2, 3, 4, and 5 are pressed into the sector pressing plate 32, and in addition, are pierced through the sector pressing plate 32 and extended in the light axis direction (toward the subject). The method of fixing the supporting members 2, 3, 4, and 5 onto the sector pressing plate 32 is not limited to press fitting, and may be bonded. FIG. 2 is a top view of the sector pressing plate 32. The supporting members 2, 3, 4, and 5 are provided outside the range of a sector drive mechanism so as not to touch the sectors 33, 34, and 35.

If the sector pressing plate 32 is supported by the protrusions 6 and 7 only, the sector pressing plate 32 will distort. This is because the sector pressing plate 32 is supported only on the ends thereof and causes the problem that impairs driving of the sectors 33, 34, and 35. The sectors 33, 34, and 35 are arranged to face the optical unit 20. Once a shock is applied, the sectors 33, 34, and 35 are brought into touch with the optical unit 20. Then, the load is applied onto the sectors 33, 34, and 35. There is the possibility that the sectors 33, 34, and 35 are distorted and cannot move properly. Therefore, in accordance with the present invention, the supporting members 2, 3, 4, and 5 are provided to retain the sector arrangement space SP between the sector substrate 31 and the sector pressing plate 32 so that the load applied to the sectors 33, 34, and 35 can be reduced. Also, the supporting members 2, 3, 4, and 5 are provided on the sector substrate 31 that overlaps the lens holder 21. The lens holder 21 is capable of receiving the shock applied on the supporting members 2, 3, 4, and 5 and alleviating the load applied to the sectors 33, 34, and 35.

Figure 3:
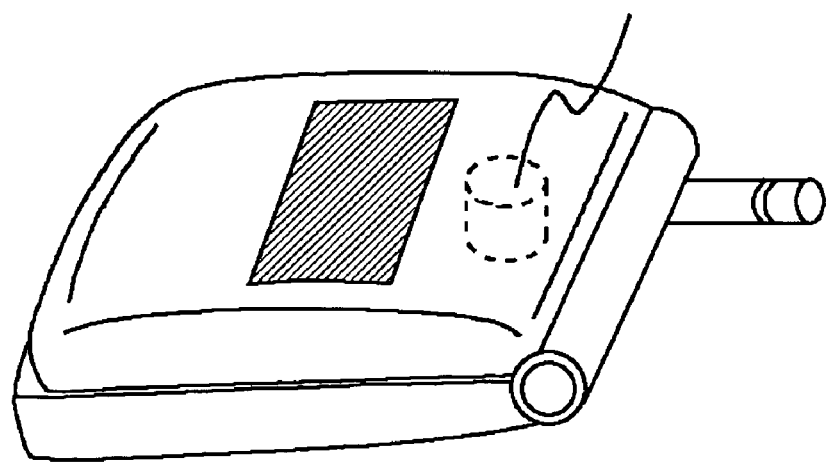
FIG. 3 is a view showing the image pickup apparatus mounted on a mobile telephone.

On the electronics apparatus such as mobile telephone having the image pickup apparatus 1 as shown in FIG. 3, the supporting members 2, 3, 4, and 5 are brought into contact with a chassis thereof. This can stable the positions of the supporting members 2, 3, 4, and 5 in the image pickup apparatus 1 and reduce the load applied onto the sectors 33, 34, and 35.

Figure 4:
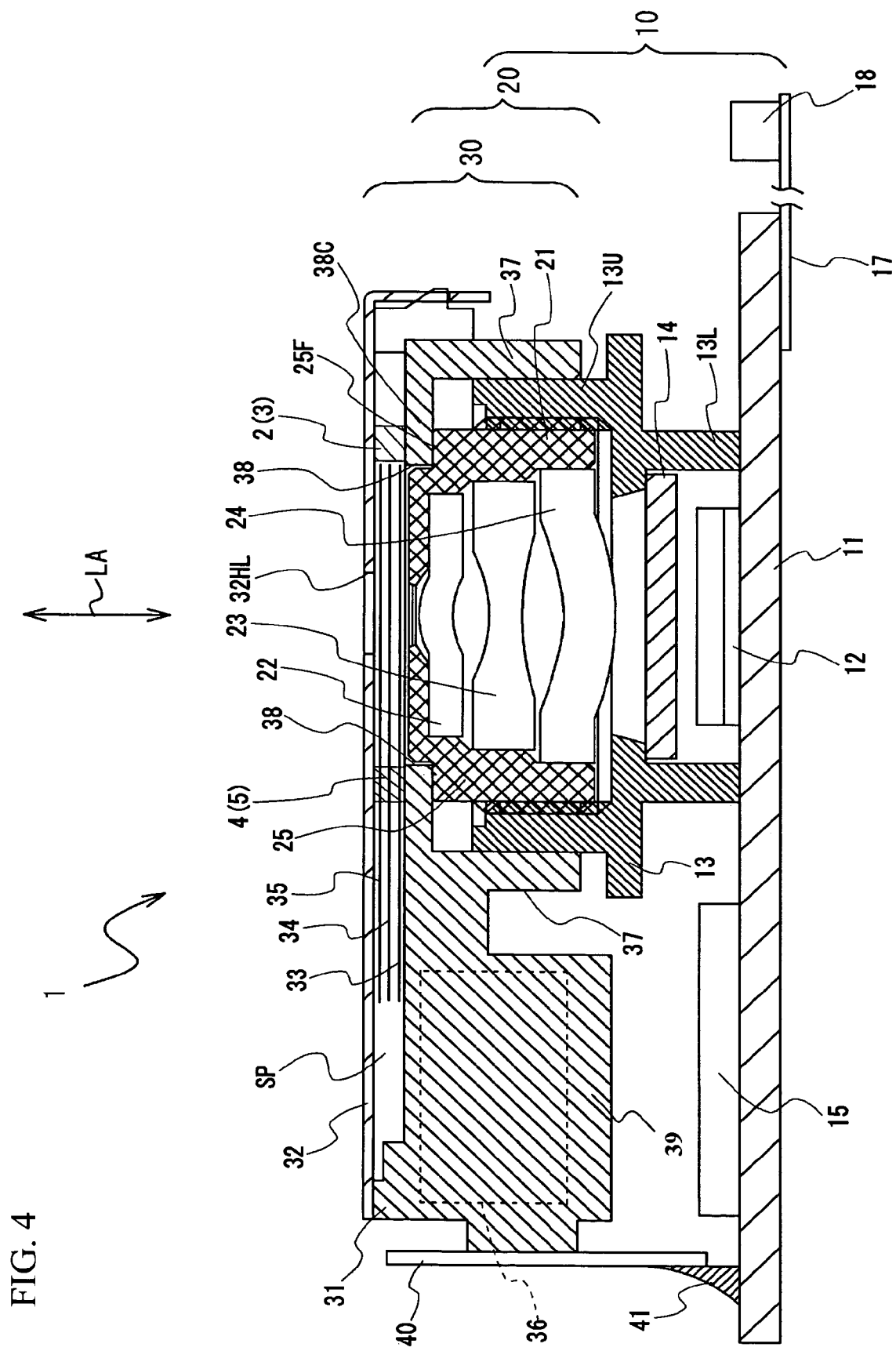
FIG. 4 is a view showing another configuration of the image pickup apparatus.

The supporting members 2, 3, 4, and 5 are provided to extend in the light axis direction (toward the subject) in accordance with the present embodiment. However, as shown in FIG. 4, heights of the supporting members 2, 3, 4, and 5 may be equal to that (width) of the sector pressing plate 32. In this case, ends of the supporting members may be fixed onto the sector pressing plates 32. Also, the places in which the supporting members 2, 3, 4, and 5 are provided are not limited to the above-mentioned ones. The supporting members 2, 3, 4, and 5 may be provided to contact with the sector substrate 31.

The sector substrate 31 includes a cylinder portion 37 and a motor housing portion 39. The cylinder portion 37 is formed to contact with the lens holder 21 and cover the upper portion 13U of the lens barrel 13. The motor housing portion 39 includes the step motor 36 serving as an actuator. A shutter opening 38 is provided in an upper portion of the cylinder portion 37. The shutter opening 38 is configured to fit with the above-mentioned cut out portion 25 provided in the upper portion of the lens holder 21. In other words, a circumferential portion 38C of the shutter opening 38 is fixed to contact with the annular surface 25F of the cut out portion 25. The sector substrate 31 includes a portion, on which the shutter opening 38 is formed, has a shape of plane plate perpendicular to the light axis LA. Accordingly, the annular surface 25F of the cut out portion 25 and the circumferential portion 38C of the shutter opening 38 are brought into contact with each other, and the sector substrate 31 is fixed perpendicularly to the light axis direction LA.

Additionally, the cut out portion 25 of the lens holder 21 is configured to include a step having a cross-section of a right angle and the shutter opening 38 is configured to fit with the cut out portion 25. This makes it possible to fit the sector substrate 31 and the lens holder 21 more accurately.

The lens holder 21 is fixed inside the lens barrel 13, as described. The shutter opening 38 of the sector substrate 31 is fit with the lens holder 21. Therefore, the relative positions of the lenses 22 through 24 in the optical unit 20 and the sector drive unit 30 do not vary in the image pickup apparatus 1. This means that field angles of the lenses 22 through 24 and an amount of incoming light thereinto do not vary in the image pickup apparatus 1. Here, the shutter opening 38 of the sector substrate 31 is fit with the lens holder 21, and does not practically serve as an opening for image taking in the image pickup apparatus 1. An opening 32HL formed on the sector pressing plate 32 corresponds to the opening for image taking in the image pickup apparatus 1, as described.

Figure 5:
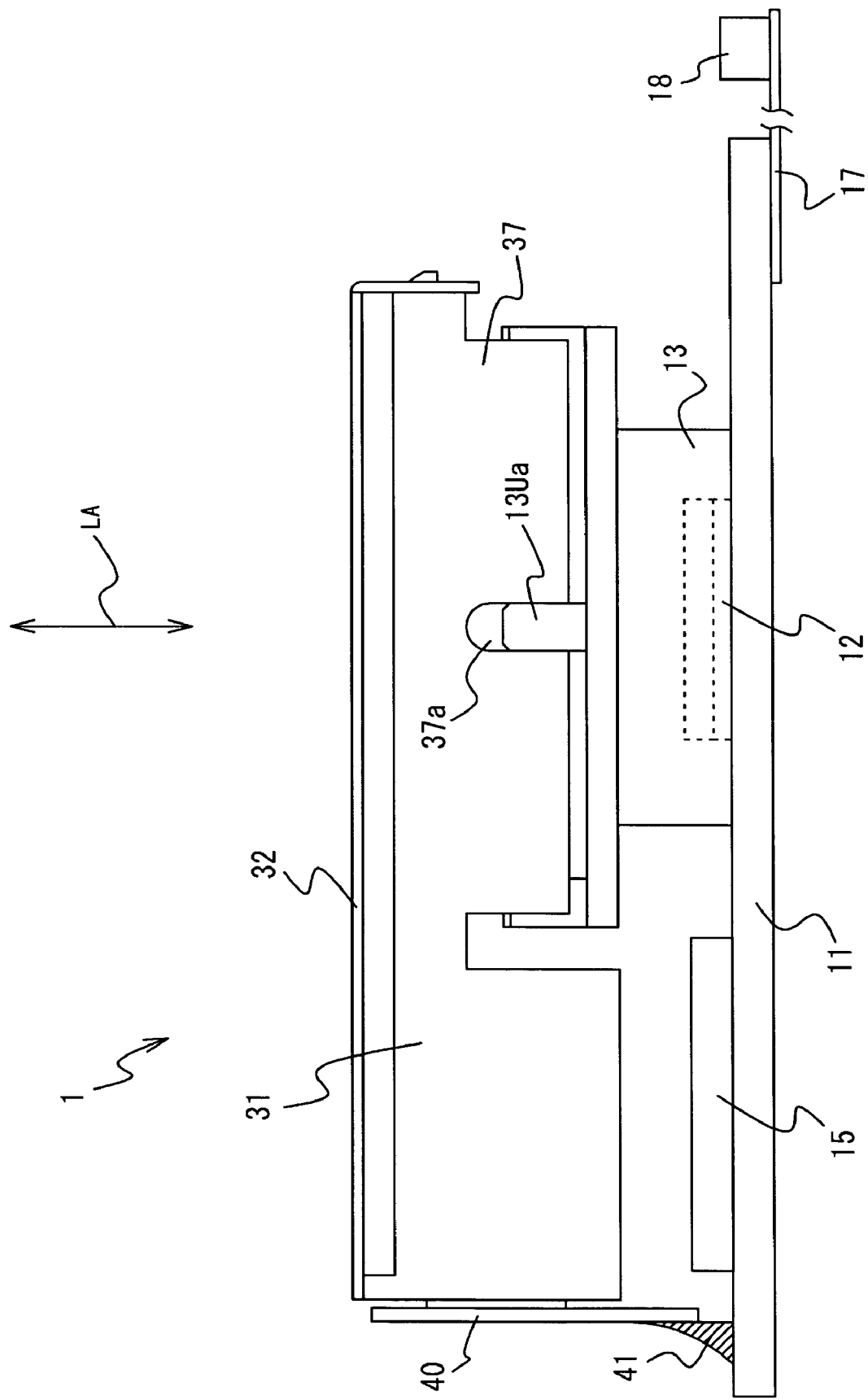
FIG. 5 is a view illustrating a relation of engagement between a cylinder portion in a sector substrate and an upper portion of a lens barrel.

A positioning mechanism is provided between the cylinder portion 37 in the sector substrate 31 and the upper portion 13U of the lens barrel 13. FIG. 5 is a view illustrating a relation of engagement between the cylinder portion 37 in the sector substrate 31 and the upper portion 13U of the lens barrel 13. FIG. 5 particularly shows the relation of an inner surface of the cylinder portion 37 and a protruding portion 13Ua formed in the upper portion 13U of the lens barrel 13. In other words, the protruding portion 13Ua is provided to protrude in a radius direction on the surface of the outer circumference in the upper portion 13U of the lens barrel 13. The protruding portion 13Ua extends in the light axis direction LA with a given length. Only one protruding portion 13Ua is shown in FIG. 5, yet multiple protruding portions 13Ua may be provided on an outer circumference, because the upper portion 13U of the lens barrel 13 has a shape of tube. On the other hand, a dent portion 37a is provided on the cylinder portion 37 of the sector substrate 31 to engage with the aforementioned protruding portion 13Ua. In this manner, the positioning mechanism is capable of positioning the sector substrate 31 of the sector drive unit 30 so as not to rotate around the light axis of the lenses 22 through 24.

The example shown in FIG. 5 includes the protruding portion provided in the upper portion 13U of the lens barrel 13 and the dent portion provided in the cylinder portion 37 of the sector substrate 31. However, the protruding portion may be provided in the cylinder portion 37 of the sector substrate 31 and the dent portion may be provided in the upper portion 13U of the lens barrel 13. That is to say, an engagement portion may be provided to engage the lens barrel 13 and the cylinder portion 37 of the sector substrate 31 so that the engagement portion can limit the position relative to the light axis of the lenses 22 through 24 in the cylinder portion 37. Here, the inner surface of the cylinder portion 37 is formed to rightly fit with the upper portion 13U of the lens barrel 13.

After the dent portion 37a is provided on the cylinder portion 37 of the sector substrate 31 to be positioned relative to the protruding portion 13Ua of the lens barrel 13, the sector substrate 31 can be fixed onto the lens barrel 13 accurately by applying the adhesive agent on the engagement portion. As seen provided on the sector drive unit 30. In this manner, there is space on the image pickup substrate 11, and so the aforementioned space is utilized to downsize the image pickup apparatus 1 as a whole. Only the inside of the image pickup apparatus 1 is not downsized. For example, a sector drive IC (control circuit element), which is provided to control driving of the sector, has a relatively large size. So, if the sector drive IC is mounted on the motherboard of the electronics apparatus, the whole apparatus becomes larger in size. The image pickup apparatus 1 is configured to provide a sector drive IC 15 on the image pickup substrate 11 with the best use of space. Thus, the electronics apparatus that mounts the image pickup apparatus 1 thereon can be downsized.

The image pickup apparatus 1 embodying the present invention is configured not to grow in size, even if the sector drive IC 15 is provided on the image pickup substrate 11. To be more detail, referring back to FIG. 1, the right side in FIG. 1 is relatively high, because the lens barrel 13 and the lens holder 21 are piled up on the right side of the image pickup apparatus 1. On the other hand, there is more space in a region facing the motor housing portion 39 on the image pickup substrate 11. The sector drive IC 15 is provided in the aforementioned region. The member used for the sector drive unit 30 is provided on or above the image pickup substrate 11, and this does not grow the whole apparatus in size. Thus, the whole apparatus can be downsized by utilizing the space effectively.

The FPC 17 is connected to the image pickup substrate 11 for connecting the electronics apparatus, as described, and a connector 18 is provided on the FPC 17 in order to connect the circuit board such as motherboard provided on the electronics apparatus. The image pickup unit 10 and the sector in FIG. 1, the upper portion 13U of the lens barrel 13 is covered with the cylinder portion 37 of the sector substrate 31 in this configuration. This configuration is capable of preventing undesired lights from coming into the lens barrel 13 from sides of the image pickup apparatus 1.

Moreover, a printed circuit board 40 is bonded to a side of the sector substrate 31 to connect an electrode of the step motor 36 to the image pickup substrate 11. The printed circuit board 40 is a hard printed board made of a base material such as polyimide resin, epoxy resin, glass epoxy resin, or the like. The printed circuit board 40 is electrically coupled with the image pickup substrate 11 via a solder 41, and fixes onto to the image pickup substrate 11 at an almost right angle. Therefore, the sector drive unit 30 is electrically coupled with the image pickup substrate 11, and is surely supported by the image pickup substrate 11 via the hard printed circuit board 40. Moreover, the sector drive unit 30 is fixed onto the image pickup substrate 11 on the side of the cylinder portion 37 via the lens barrel 13, as described above. In this manner, the sector drive unit 30 is stably supported by the image pickup substrate 11. Hence, the image pickup apparatus 1 is excellent in the impact resistance, and is capable of reducing the load occurred therein. The sector drive unit 30 does not touch or damage neighboring members in the image pickup apparatus 1, causing no problem.

The printed circuit board 40 is connected to the image pickup substrate 11 in the image pickup apparatus 1, as described. This makes it possible to control the step motor 36 with the image pickup substrate 11. With this configuration, electronics parts for the motor can be provided on the image pickup substrate 11, although the electronics parts for the motor should be drive unit 30 can be controlled only by connecting the connector 18 and the motherboard of the electronics apparatus. The image pickup apparatus 1 is capable of simplifying the electric configuration as compared to the conventional method of separately controlling the sector drive unit 30 and the image pickup optical module.

Figure 6:
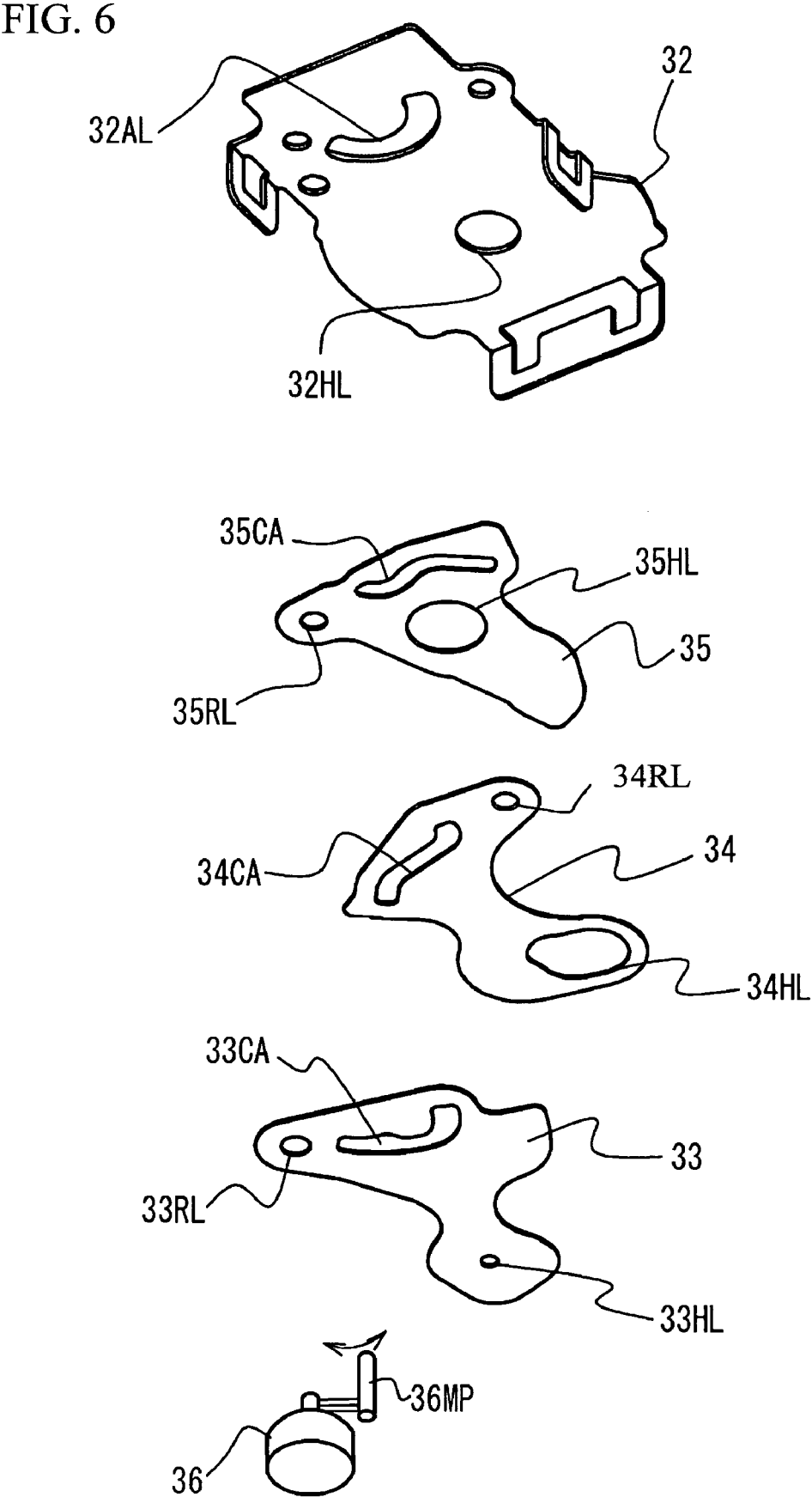
FIG. 6 is a perspective view showing three sectors provided in a space between the sector substrate and a sector pressing plate and the sector pressing plate.

FIG. 6 is a perspective view showing three pieces of the sectors 33, 34, and 35 and the sector pressing plate 32, the sectors 33, 34, and 35 being provided in the sector arrangement space SP between the sector substrate 31 and the sector pressing plate 32. The sectors 33, 34, and 35 respectively include bearing holes 33RL, 34RL, and 35RL fit with a spindle, not shown, provided on the sector substrate 31. The sectors 33, 34, and 35 rotate around the spindle. Also, cam holes 33CA, 34CA, and 35CA are respectively provided in the sectors 33, 34, and 35. An actuating pin 36MP fixed onto the step motor 36 is engaged with all the cam holes. As the actuating pin 36MP moves in a given range due to the rotation of the step motor 36, the sectors 33, 34, and 35 respectively rotate and draw trajectories according to the shape of the cam hole.

The sector 33 is a small aperture blade having a small aperture hole 33HL. The sector 34 is provided to prevent hitting of the sectors 33 and 35. The sector 34 is configured to contact both the sectors 33 and 35 all the time to prevent the hitting. The sector 34 includes an opening 34HL having a large diameter so as not to disturb image taking, even if the sector 34 is provided near the shutter opening 38. On the other hand, the sector 35 is a shutter blade. An opening 35HL is provided in the sector 35 in order to reduce the weight. The sector pressing plate 32 includes an opening 32AL having a shape of arc and an opening 32HL. The opening 32AL is provided for the movement of the actuating pin 36MP. The opening 32HL used for image taking is arranged in a position corresponding to the shutter opening 38 of the sector substrate 31.

Referring to FIG. 1 again, a description will be given of a manufacturing method of the image pickup apparatus 1. The image pickup element 12 is mounted on a given position of the image pickup substrate 11 of the image pickup unit 10. The optical filter 14 is bonded in the lower portion 13L of the lens barrel 13 to securely fix the lens barrel 13 onto the image pickup substrate 11. The image pickup unit 10 is produced in this manner. The lens holder 21 retaining three lenses is screwed into the lens barrel 13 for focus adjustment, and an adhesive agent is applied to securely fix the screwed portion after the focus adjustment. Here, the optical unit 20 is fixed onto the image pickup unit 10 and the image pickup optical module is thus completed.

The sectors 33, 34, and 35 are sandwiched by the sector substrate 31 and the sector pressing plate 32 to securely fix the sector substrate 31 and the sector pressing plate 32. The step motor 36 is housed in the motor housing portion 39 of the sector substrate 31. The printed circuit board 40 for the motor is bonded with one end of the sector substrate 31. In this manner, the sector drive unit 30 is completed. Then, the sector drive unit 30 is fixed onto the image pickup optical module.

More specifically, the dent portion 37a provided on the cylinder portion 37 is fit with the protruding portion 13Ua of the lens barrel 13, and at the same time, the shutter opening 38 is fit with the cut out portion 25 in the lens holder 21. In this manner, multiple places are positioned, ensuring accurate arrangement of the sector drive unit 30 on the image pickup optical module. The adhesive agent is applied to securely fix a fit portion in which the dent portion 37a of the cylinder portion 37 is fit with the protruding portion 13Ua of the lens barrel 13. In the end, the printed circuit board 40 bonded to the sector substrate 31 is soldered with the image pickup substrate 11 of the image pickup unit 10. The image pickup apparatus 1, excellent in the impact resistance, is completed.

Figure 7A:
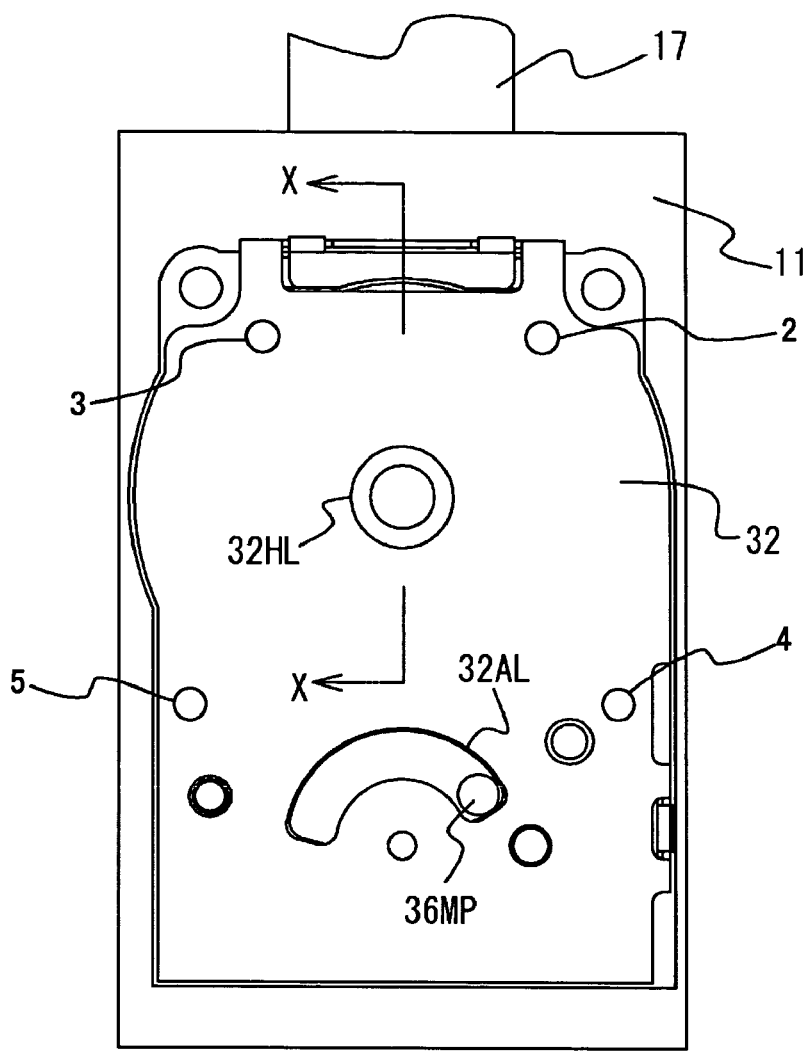
FIGS. 7A and 7B are views showing the image pickup apparatus when the sectors are fully opened.
Figure 7B:
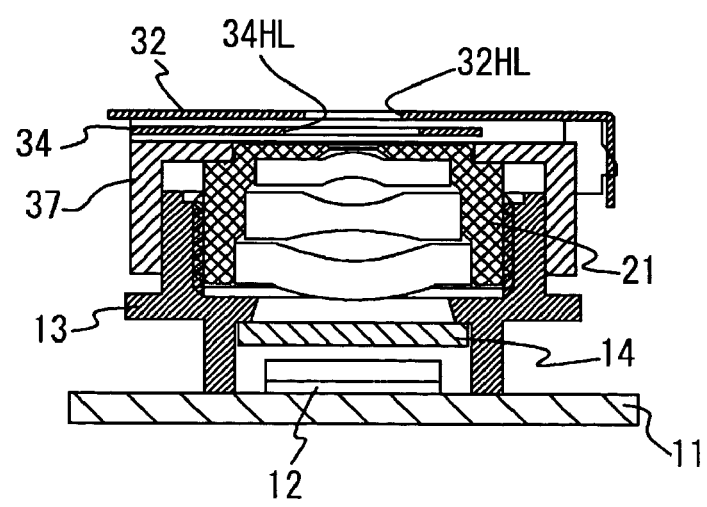
Figure 8A:
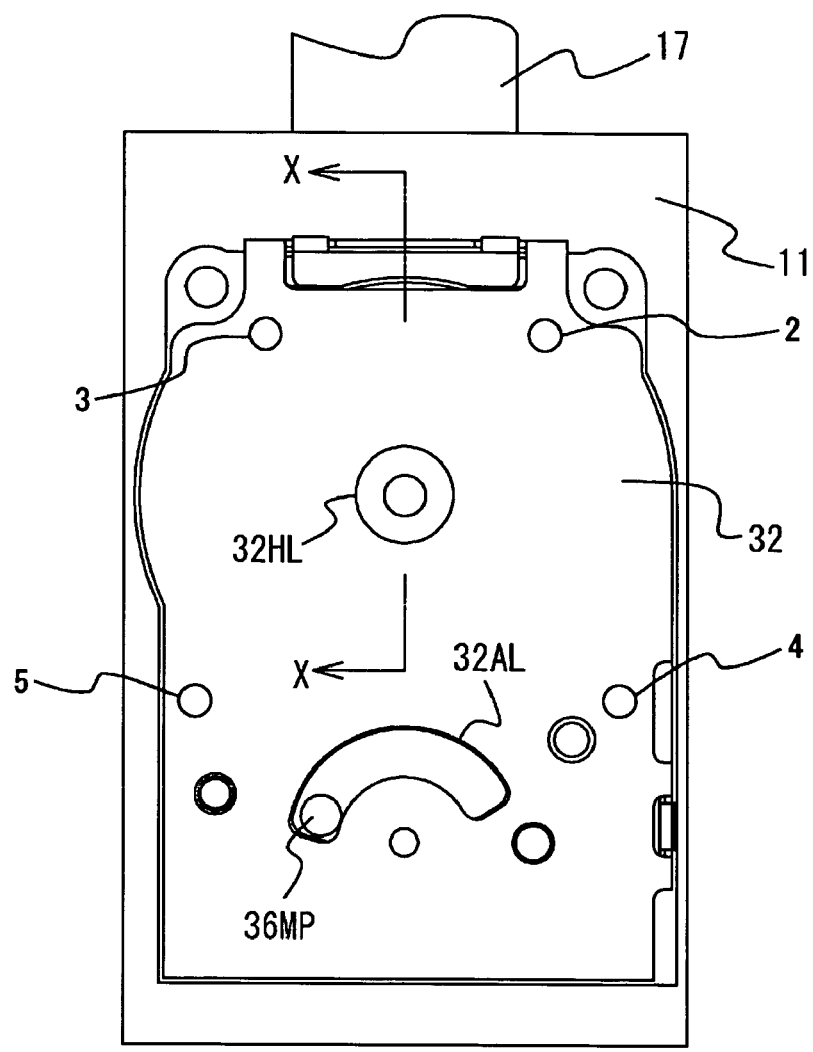
FIGS. 8A and 8B are views showing the image pickup apparatus when the sectors are in small aperture.
Figure 8B:
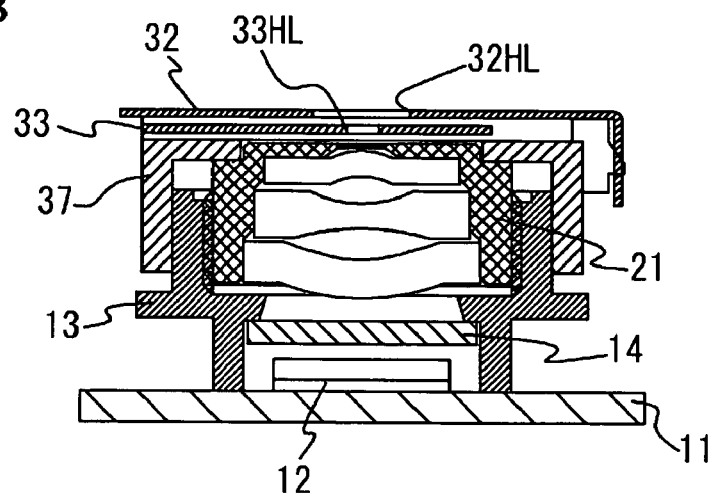

FIGS. 7A and 7B are views showing the image pickup apparatus 1 when the sectors are fully opened. FIGS. 8A and 8B are views showing the image pickup apparatus 1 when the sectors are in small aperture. FIGS. 7A and 8A are plan views viewed from the sector pressing plate 32, and FIGS. 7B and 8B are cross-sectional views taken along a line X-X shown in FIGS. 7A and 8A. FIGS. 7B and 8B show only the sector near the opening 32HL of the sector pressing plate 32.

In a full open state shown in FIGS. 7A and 7B, the actuating pin 36MP moved by the step motor 36 comes to a right end of the opening 32AL having a shape of arc provided in the sector pressing plate 32. In this state, the sectors 33 and 35 come to be far from the opening 32HL, and the sector 34 provided therebetween comes to a position facing the opening 32HL. The sector 34 has the opening 34HL having a large diameter, and is capable of supporting the full open state readily, as shown in FIG. 6.

In a small aperture state shown in FIGS. 8A and 8B, the actuating pin 36MP moved by the step motor 36 comes to a left end of the opening 32AL having a shape of arc of the sector pressing plate 32. In this state, the sector 35 comes to be far from the opening 32HL, and the sector 33 having the small aperture hole and the sector 35 come to the position facing the opening 32HL, as shown in FIG. 6. FIG. 8B shows only the sector 33. A full close state is formed when the actuating pin 36MP substantially comes to a central point of the opening 32AL having a shape of arc of the sector pressing plate 32, and all the sectors come to the position facing the opening 32HL, although this is not shown.

The image pickup apparatus 1 is capable of normal image taking in the full open state as shown in FIGS. 7A and 7B. The small aperture state shown in FIGS. 8A and 8B enables macro photography. The depth of field becomes deep in the small aperture state of the opening, ensuring the macro photography without moving the lens.

The image pickup apparatus 1, as described, is configured to provide the supporting members 2, 3, 4, and 5 to reduce the load applied to the sectors 33, 34, and 35. This makes it possible to move the sectors 33, 34, and 35 without trouble.

The sector substrate 31 is brought into contact with the lens holder 21, and a distance between the lens and the opening for the image taking can be kept constant. Even if the sector drive unit is arranged closer to the subject than to the lenses 22 through 24, the field angle of the lens 22 through 24 or the amount of incoming light is not varied in the image pickup apparatus. In addition, a top surface (provided on the subject side) of the lens holder 21 is pressed by the sector substrate 31 in the image pickup apparatus 1. The lens holder 21 and the lens barrel 13 are screwed together, preventing the lens holder 21 from inclining.

The cylinder portion 37 in the sector substrate 31 is engaged with the lens barrel 13, and the sector drive unit can be arranged accurately relative to the light axis on the image pickup optical unit with the sector substrate 31. Furthermore, the cylinder portion 37 covers an upper portion of the lens barrel 13, and this can prevent the undesired light from coming into. The electronics apparatus such as camera, mobile telephone, or the like mounting the image pickup apparatus 1 in the above-mentioned configuration thereon can be downsized and a brilliant pickup image can be captured.

In the embodiment described above, a description has been given of an example having the lens holder 21 directly fit with the shutter opening 38 of the sector substrate 31, yet the present invention is not limited to the aforementioned example. The shutter opening 38 and the lens holder 21, for example, may be fixed via a spacer having given thickness. In this configuration, the distance between the optical unit 20 and the sector drive unit 30 can be configured as necessary. The shutter opening 38 is not directly fit with the lens holder 21 as described above, and the shutter opening 38 serves as an opening at the time of image taking.

Moreover, in the embodiment described above, the cut out portion 25 having the annular surface perpendicular to the light axis direction LA is provided on the circumference of the lens holder 21, yet the present embodiment is not limited to this. The distance between the lens and the opening for image taking may be kept constant. Another configuration may be employed to keep the distance between the lens and the opening for image taking may be kept constant, with the lens holder 21 being contact with another portion of the sector substrate 31.

The present invention is not limited to the above-mentioned embodiment, and other embodiments, variations and modifications may be made without departing from the scope of the present invention.

The present invention is based on Japanese Patent Application No. 2004-244250 filed on Aug. 24, 2004, the entire disclosure of which is hereby incorporated by reference.

What is claimed is:

1. An image pickup apparatus comprising:
an image pickup unit having an image pickup element;
an optical unit having lenses;
a sector drive unit having sectors arranged in a space for arranging the sectors;
supporting members being fixed in the space for arranging the sectors and having lengths equal to at least a width of the space for arranging the sectors in a light axis direction;
wherein the space for arranging the sectors is provided between a sector substrate in contact with a subject side of the optical unit and a sector pressing plate that presses the sectors;
the supporting members are fixed onto the sector substrate in a region in which the sector substrate overlaps a lens holder that holds the lenses; and
wherein the image pickup unit is coupled to the sector substrate.

2. The image pickup apparatus as claimed in claim 1, wherein the supporting members protrude from the sector pressing plate in the light axis direction.

3. An electronics apparatus comprising an image pickup apparatus, the image pickup apparatus including:

an image pickup unit having an image pickup element;

an optical unit having lenses;

a sector drive unit having sectors arranged in a space for arranging the sectors;

supporting members protruding from the space for arranging the sectors in the light axis direction and being in contact with a chassis of the electronics apparatus;

wherein the space for arranging the sectors is provided between a sector substrate in contact with a subject side of the optical unit and a sector pressing plate that presses the sectors;

the supporting members are fixed onto the sector substrate in a region in which the sector substrate overlaps a lens holder that holds the lenses; and wherein the image pickup unit is coupled to the sector substrate.

* * * * *